US009991817B2

(12) United States Patent
Shimomugi et al.

(10) Patent No.: US 9,991,817 B2
(45) Date of Patent: Jun. 5, 2018

(54) POWER CONVERTING DEVICE THAT USES A SINE-WAVE-SHAPED CURRENT CONTROL RANGE TO OUTPUT DRIVE SIGNAL

(71) Applicant: Mitsubishi Electric Corporation, Tokyo (JP)

(72) Inventors: Takuya Shimomugi, Tokyo (JP); Koichi Arisawa, Tokyo (JP); Takashi Yamakawa, Tokyo (JP); Yuji Takayama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days. days.

(21) Appl. No.: 15/326,776

(22) PCT Filed: Aug. 5, 2014

(86) PCT No.: PCT/JP2014/070576
§ 371 (c)(1),
(2) Date: Jan. 17, 2017

(87) PCT Pub. No.: WO2016/020980
PCT Pub. Date: Feb. 11, 2016

(65) Prior Publication Data
US 2017/0207718 A1  Jul. 20, 2017

(51) Int. Cl.
*H02M 7/06* (2006.01)
*H02M 1/12* (2006.01)
(Continued)

(52) U.S. Cl.
CPC ............. *H02M 7/06* (2013.01); *H02M 1/083* (2013.01); *H02M 1/12* (2013.01); *H02M 1/42* (2013.01); *H02M 2001/0009* (2013.01)

(58) Field of Classification Search
CPC ...... H02M 1/4225; H02M 1/12; H02M 1/083; H02M 1/36; H02M 1/42; H02M 2001/0009; H02M 7/06
See application file for complete search history.

(56) References Cited

U.S. PATENT DOCUMENTS 7,580,272 B2   8/2009   Taguchi et al.
7,723,964 B2   5/2010   Taguchi
(Continued)

FOREIGN PATENT DOCUMENTS

JP   H03-040752 A   2/1991
JP   H07-89743 A    9/1995
(Continued)

OTHER PUBLICATIONS

International Search Report of the International Searching Authority dated Oct. 28, 2014 for the corresponding international application No. PCT/JP2014/070576 (and English translation).
(Continued)

*Primary Examiner* — Henry Lee, III
(74) *Attorney, Agent, or Firm* — Posz Law Group, PLC

(57) ABSTRACT

A power converting device includes: a rectifying circuit connected to an alternating-current power supply for converting alternating-current power from the alternating-current power supply into direct-current power; a short-circuit unit constituted by a diode bridge and a short-circuit element connected to opposite output ends of the diode bridge for short-circuiting the alternating-current power supply via a reactor; and a control unit that generates plural drive signals to control the short-circuit unit during a half cycle of the alternating-current power supply. The control unit generates a sine-wave-shaped current control range that is a target control range of power supply current of the alternating-current power supply, and maintains values of the power
(Continued)

supply current of the alternating-current power supply within the current control range.

10 Claims, 10 Drawing Sheets

(51) Int. Cl.
*H02M 1/42* (2007.01)
*H02M 1/08* (2006.01)
*H02M 1/00* (2006.01)

(56) References Cited

U.S. PATENT DOCUMENTS

| | | | |
|---|---|---|---|
| 8,508,195 B2 | 8/2013 | Uno | |
| 2011/0227522 A1* | 9/2011 | Shinomoto | H02M 1/4225 318/400.29 |

FOREIGN PATENT DOCUMENTS

| | | |
|---|---|---|
| JP | H11-206130 A | 7/1999 |
| JP | 2000-308353 A | 11/2000 |
| JP | 2004-007880 A | 1/2004 |
| JP | 2005-253284 A | 9/2005 |
| JP | 2007-028781 A | 2/2007 |
| JP | 2007-129849 A | 5/2007 |
| JP | 2011-101505 A | 5/2011 |
| JP | 2011-125102 A | 6/2011 |
| JP | 2013-106455 A | 5/2013 |
| JP | 2013-110785 A | 6/2013 |
| JP | 5316823 B2 | 7/2013 |
| JP | 2014-101890 A | 6/2014 |
| JP | 2015-171196 A | 9/2015 |
| JP | 5868920 B2 | 1/2016 |

OTHER PUBLICATIONS

Office Action dated Jan. 9, 2018 issued in corresponding JP patent application No. 2016-539714 (and English translation thereof).

* cited by examiner

POWER CONVERTING DEVICE THAT USES A SINE-WAVE-SHAPED CURRENT CONTROL RANGE TO OUTPUT DRIVE SIGNAL

CROSS REFERENCE TO RELATED APPLICATION

This application is a U.S. national stage application of International Patent Application No. PCT/JP2014/070576 filed on Aug. 5, 2014, the disclosure of which is incorporated herein by reference.

TECHNICAL FIELD

The present invention relates to a power converting device that converts alternating-current power into direct-current power.

BACKGROUND

The conventional technique taught in Patent Literature 1 below discloses a power-factor improving circuit that improves the source power factor to reduce harmonic components contained in the input current. In the power-factor improving circuit, a full-wave rectification mode or a double-voltage rectification mode is selected while the short-circuit start time and short-circuit time of a short-circuit element is controlled in open-loop, so as to realize the functions of improving the power factor and boosting the voltage. That is, the conventional technique of Patent Literature 1 turns on and off a rectifying circuit switch to control a rectifying circuit in the full-wave rectification mode or the double-voltage rectification mode, so that the direct-current output voltage range of the power-factor improving circuit is largely classified into two levels. The area of each of these two levels is further classified, by a variable short-circuiting control of the short-circuit element in the open-loop, into two levels, one without an improved power factor and the other with an improved power factor. Accordingly, the conventional technique provides a total of the four levels of the direct-current output voltage areas, so that the power factor on the high-load side can be improved while the output range of the direct-current output voltage is enlarged.

In the conventional technique shown in Patent Literature 2 below, there is provided a direct-current voltage control unit that outputs a direct-current voltage control signal in correspondence to the deviation value between a direct-current output voltage reference value set corresponding to the load and the voltage across the terminals of a smoothing capacitor, and also there is provided a current reference arithmetic unit that outputs a current reference signal from the product of the control signal from the direct-current voltage control unit and a sine-wave-shaped synchronizing signal synchronous with an alternating-current power supply. By comparing this current reference signal and the current on the alternating-current side of a rectifying element, a switch element is switched on/off at a high frequency to control the direct-current output voltage to be at a desired value while controlling the alternating-current input current to be sine-wave-shaped, so that the source power factor is 1 suppressing the occurrence of harmonics.

PATENT LITERATURE

Patent Literature 1: Japanese Patent Application Laid-open Publication No. H11-206130

Patent Literature 2: Japanese Patent description No. 2140103

However, according to the conventional techniques of the above Patent Literatures 1, 2, the control pattern of the short-circuit element is limited. That is, in these conventional techniques, the control pattern of the short-circuit element is limited to either a high-frequency switching mode in which the current is fed back in the full-load area or a partial switching mode of current open-loop control. Thus, these conventional techniques do not operate the short-circuit element in the low load area in order to avoid excessive boosting of the direct-current output voltage. As a result, the power factor improvement is not performed. Therefore, for the low load area, the waveform distortion of the input current is so large that a current containing harmonic components in large amounts flows through a reactor, and thus reactor iron loss increases. This results in a decrease in the AC/DC conversion efficiency of the power-factor improving circuit.

Further, in the conventional technique of the above Patent Literature 1, the short-circuiting control of the short-circuit element to perform the power-factor improvement is a partial switching method that controls the short-circuit start time and short-circuit time in the open-loop to perform the short-circuiting operation during only a given section of the power-supply cycle, and hence, the power factor improvement and the boosting of the direct-current output voltage are enabled while the effect is small on the high-load side where the amount of occurrence of harmonics is large. Therefore, a reactor having a large inductance value is needed under the future stricter regulations on the harmonics in order to obtain an enough power-factor improvement effect, that is, enough capability of suppressing harmonics in the conventional technique. As a result, the problems of the decrease in the AC/DC conversion efficiency, the up-sizing of the circuit size and the cost increase arise. Further, where the direct-current output voltage is boosted keeping the occurrence amount of harmonics at a given level, the operation on the high-load side is unstable due to the limited boosting capability, or the range of the load selection is narrow from the viewpoint of stable operation on the high-load side.

SUMMARY

The present invention has been made in view of the foregoing, and an object of the invention is to provide a power converting device that can achieve high boost performance and meet a harmonic standard while achieving higher efficiency across the entire load operation area.

In order to solve the above problems and achieve the object, a power converting device of the present invention comprises a rectifying circuit that converts alternating-current power from an alternating-current power supply into direct-current power; a short-circuit unit that short-circuits the alternating-current power supply via a reactor; and a control unit that generates multiple switching pulses to control the short-circuit unit during a half cycle of the alternating-current power supply. The control unit generates a sine-wave-shaped current control range that is a target control range of power supply current of the alternating-current power supply to make values of the power supply current fall within the current control range.

According to this invention, since the current control range is sine-wave-shaped, the peaks of the power supply current can be suppressed during the half cycle of the alternating-current power supply, thereby achieving the effect of providing the high boost performance and meeting the harmonic standard while achieving the higher efficiency across the entire load operation area.

DETAILED DESCRIPTION

Embodiments of the power converting device according to the present invention will be described in detail below with reference to the drawings. Note that these embodiments are not intended to limit the present invention.

First Embodiment

Figure 1:
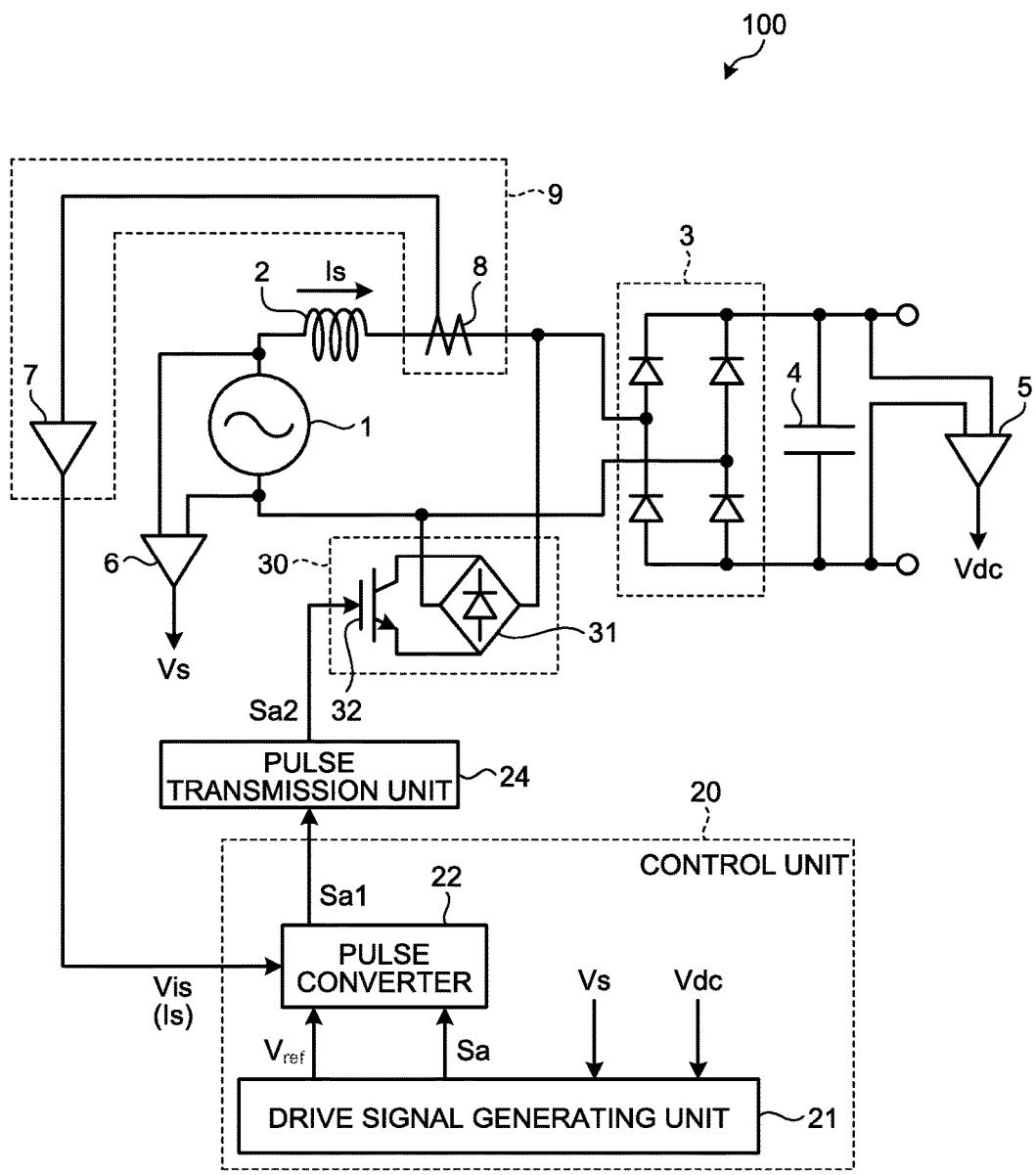
FIG. 1 is a diagram showing a configuration example of a power converting device according to a first embodiment of the present invention.
Figure 2:
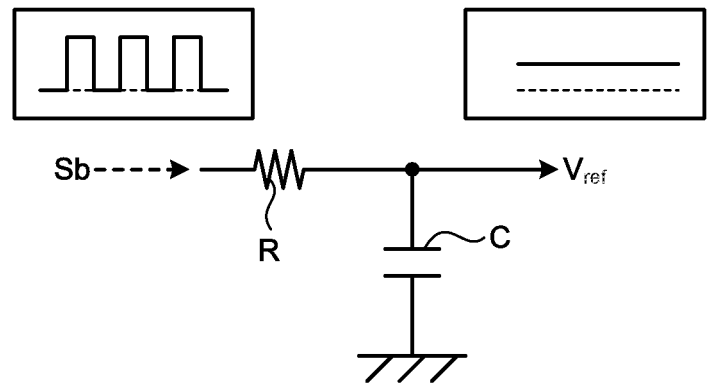
FIG. 2 is a first configuration diagram of a circuit for generating a reference voltage for pulse control.
Figure 3:
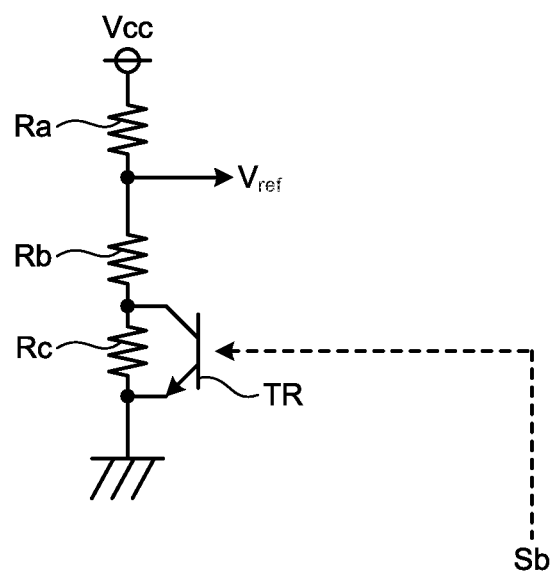
FIG. 3 is a second configuration diagram of the circuit for generating the reference voltage for pulse control.
Figure 4:
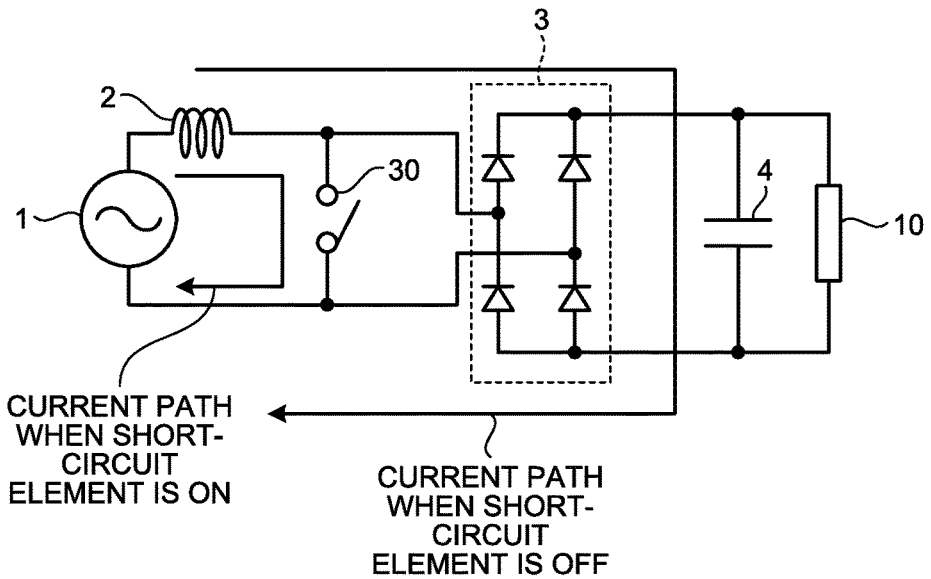
FIG. 4 is a diagram showing a simplified circuit comprised of a reactor, a short-circuit unit, a rectifying circuit, and a smoothing capacitor.
Figure 5:
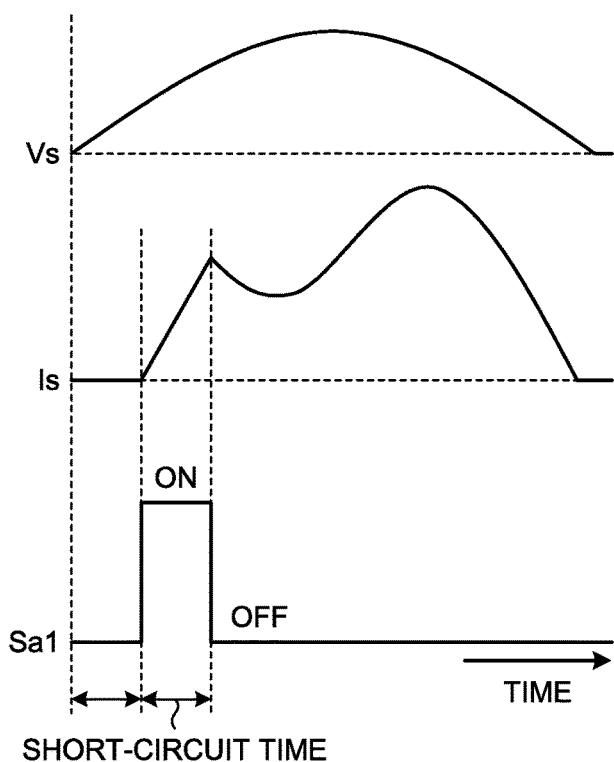
FIG. 5 is a diagram showing the waveform of power supply current when switching of a short-circuit element is performed once during a positive-polarity-side half cycle of an AC power supply in a partial switching pulse mode.
Figure 6:
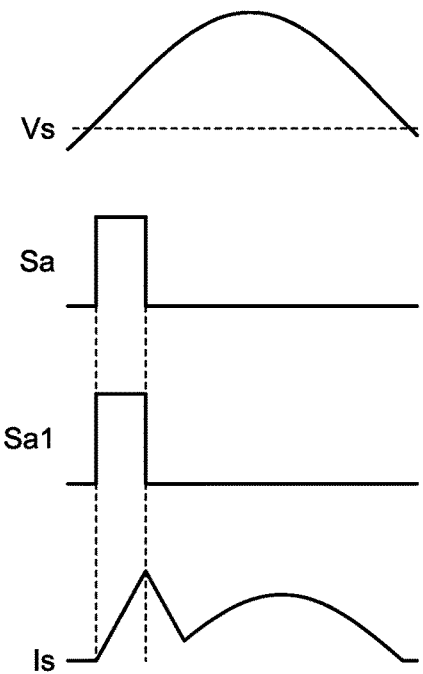
FIG. 6 is an explanatory diagram of operation in a case where a pulse converter does not perform pulse conversion.
Figure 7:
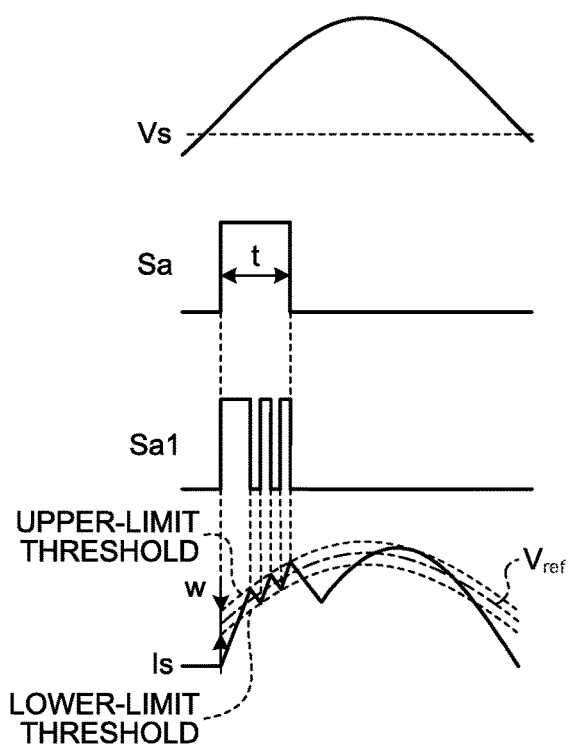
FIG. 7 is an explanatory diagram of operation in a case where the pulse converter performs the pulse conversion.
Figure 8:
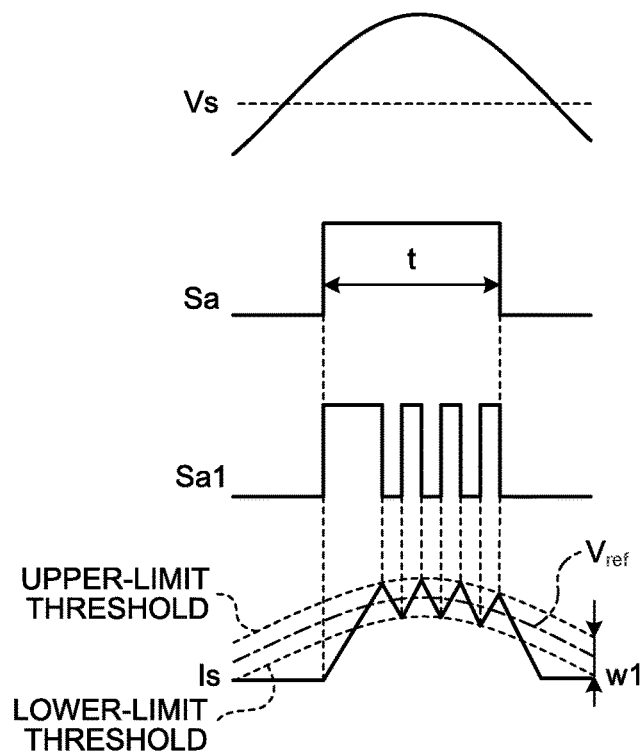
FIG. 8 is a diagram showing a state where a current control range is widened.
Figure 9:
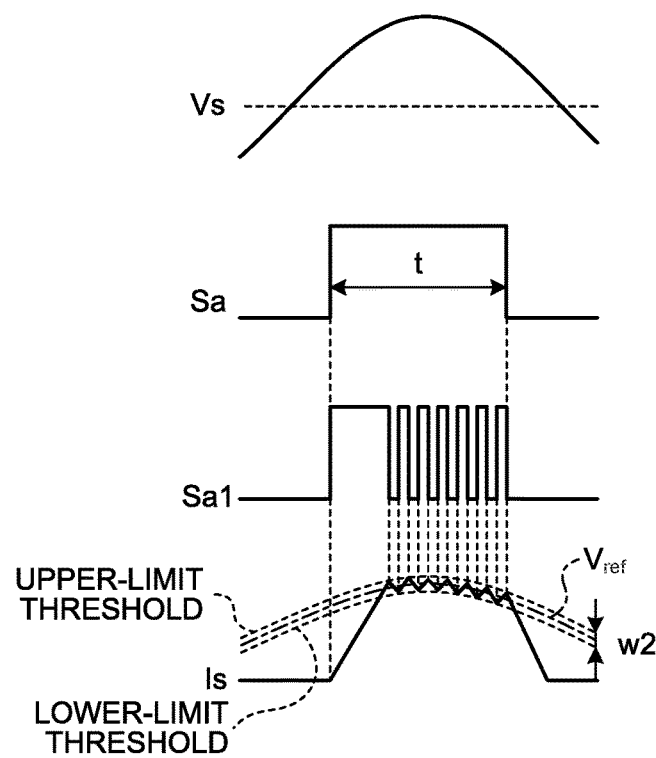
FIG. 9 is a diagram showing a state where the current control range is narrowed.
Figure 10:
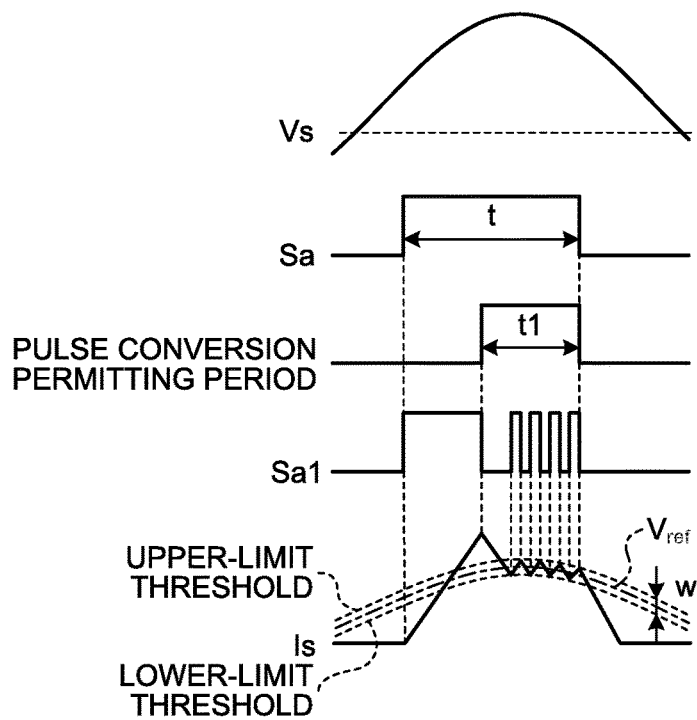
FIG. 10 is an explanatory diagram of operation when pulse conversion is performed during a period shorter than the ON period of a drive signal.
Figure 11:
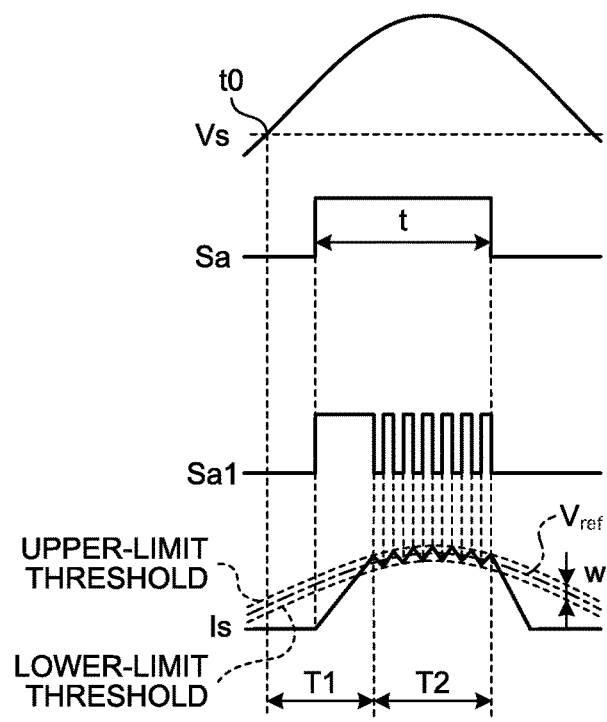
FIG. 11 is an explanatory diagram of operation in a case where pulse conversion is performed in correspondence to a time having elapsed from a zero cross of a power supply voltage.
Figure 12:
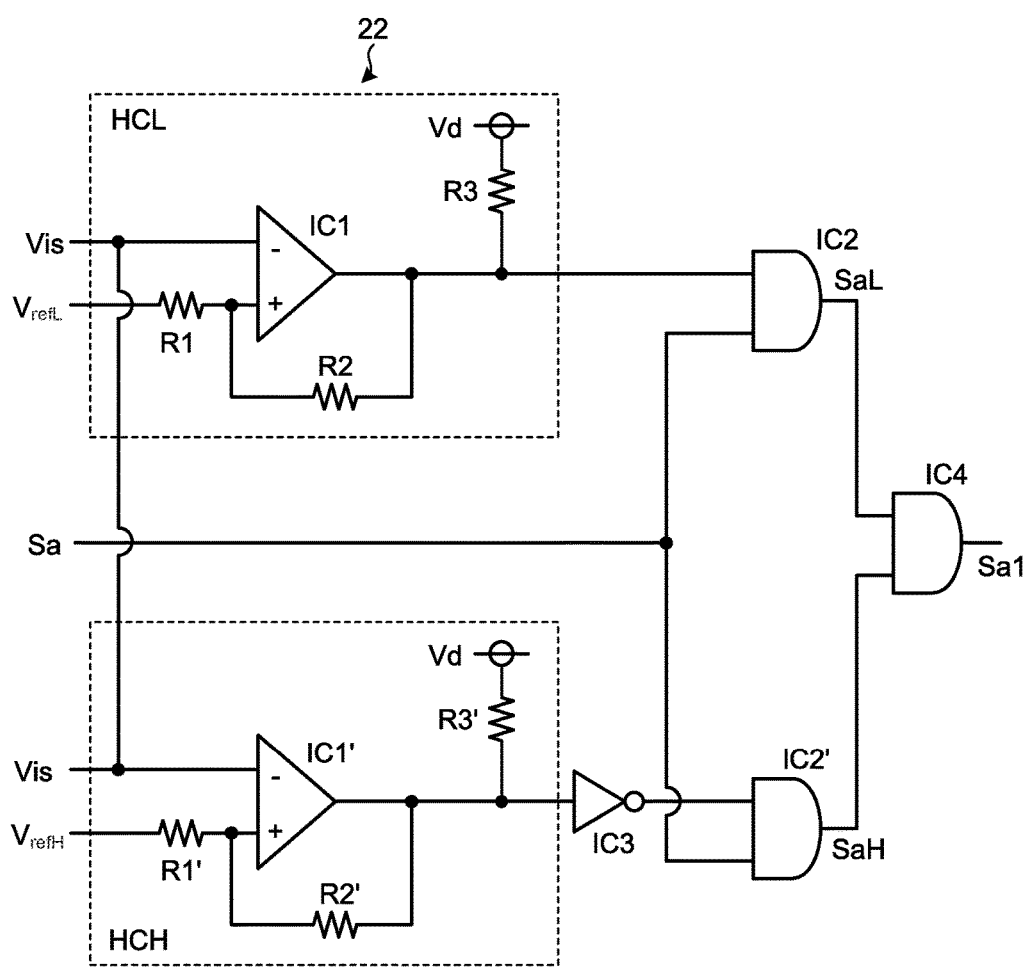
FIG. 12 is a diagram showing a configuration example of the pulse converter.
Figure 13:
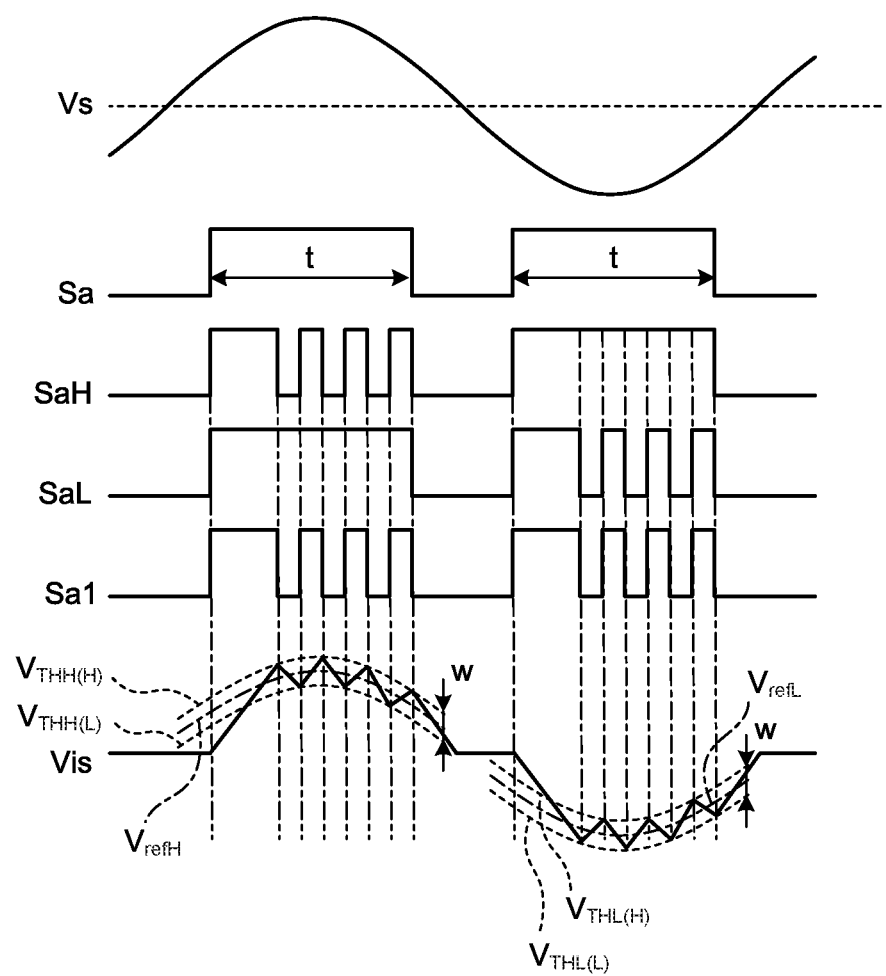
FIG. 13 is an explanatory diagram of operation in a case where the pulse converter shown in FIG. 12 is used.

FIG. 1 is a diagram showing configuration example of a power converting device 100 according to a first embodiment of the present invention. FIG. 2 is a first configuration diagram of a circuit for generating a reference voltage for pulse control. FIG. 3 is a second configuration diagram of the circuit for generating the reference voltage for pulse control. FIG. 4 is a diagram showing a simplified circuit comprised of a reactor 2, a short-circuit unit 30, a rectifying circuit 3, and a smoothing capacitor 4. FIG. 5 is a diagram showing the waveform of power supply current Is when switching of a short-circuit element 32 is performed once during a positive-polarity-side half cycle of an AC power supply 1 in a partial switching pulse mode. FIG. 6 is an explanatory diagram of operation in a case where a pulse converter 22 does not perform pulse conversion. FIG. 7 is an explanatory diagram of operation in a case where the pulse converter 22 performs the pulse conversion. FIG. 8 is a diagram showing a state where a current control range is widened. FIG. 9 is a diagram showing a state where the current control range is narrowed. FIG. 10 is an explanatory diagram of operation when pulse conversion is performed during a period shorter than an ON period t of a drive signal Sa. FIG. 11 is an explanatory diagram of operation in a case where pulse conversion is performed in correspondence to a time having elapsed from a zero cross of a power supply voltage Vs. FIG. 12 is a diagram showing a configuration example of the pulse converter 22. FIG. 13 is an explanatory diagram of operation in a case where the pulse converter 22 shown in FIG. 12 is used.

The power converting device 100 shown in FIG. 1 generates a DC voltage on the basis of an AC voltage supplied from the AC power supply 1, to supply the DC voltage to a DC load 10 shown in FIG. 4 and includes the reactor 2, the rectifying circuit 3, the smoothing capacitor 4, a DC voltage detector 5, a power supply voltage detector 6, a current detector 9, a control unit 20, a pulse transmission unit 24, and the short-circuit unit 30.

The reactor 2 is connected on the AC power supply 1 side of the short-circuit unit 30 and is inserted, for example, between one input end of the rectifying circuit 3 and the AC power supply 1. The rectifying circuit 3 is connected to the AC power supply 1 via the reactor 2 and converts the AC voltage of the AC power supply 1 into a DC voltage. Although the rectifying circuit 3 illustrated in the figure is constituted by a diode bridge in which four diodes are combined, not being limited to this, it may be constituted by a combination of diode-connected metal oxide film semiconductor field-effect transistors that are unidirectional conductive elements.

The smoothing capacitor 4 is connected between the output ends of the rectifying circuit 3 and smooths a voltage of a full-wave rectified waveform output from the rectifying circuit 3. The DC load 10 is connected in parallel with the smoothing capacitor 4, between opposite ends of the smoothing capacitor 4.

The current detector 9 is constituted by a current detecting element 8 and a current detecting unit 7. The current detecting element 8 is connected between the reactor 2 and the rectifying circuit 3 to detect the current value at the connection position. For example, a current transformer or a shunt resistor is used as the current detecting element 8. The current detecting unit 7, which is made of an amplifier or a level shift circuit, converts a voltage proportional to the current detected by the current detecting element 8, into a current detection voltage Vis within a low voltage range that can be handled by the control unit 20, after which the current detecting unit 7 outputs the current detection voltage Vis.

The DC voltage detector 5, which is made of an amplifier or a level shift circuit, detects the voltage across the smoothing capacitor 4 and converts the detected voltage into a detected voltage value within a low voltage range that can be handled by the control unit 20, after which the DC voltage detector 5 outputs the detected voltage value.

The short-circuit unit 30 that is a bidirectional switch is constituted by a diode bridge 31 connected in parallel with the AC power supply 1 via the reactor 2, and the short-circuit element 32 connected to opposite output ends of the diode bridge 31. If the short-circuit element 32 is a metal oxide film semiconductor field-effect transistor, the gate of the short-circuit element 32 is connected to the pulse transmission unit 24, and the short-circuit element 32 is turned on/off by a drive signal Sa2 that is a gate drive signal from the pulse transmission unit 24, and, when the short-circuit element 32 is turned on, the AC power supply 1 is short-circuited via the reactor 2 and the diode bridge 31.

The control unit 20 has a drive signal generating unit 21 and the pulse converter 22 and is constituted by a microcomputer or a central processing unit.

On the basis of the value of a DC output voltage Vdc detected by the DC voltage detector 5 and the value of the power supply voltage Vs detected by the power supply voltage detector 6, the drive signal generating unit 21 generates the drive signal Sa that is plural switching pulses to control the short-circuit element 32 of the short-circuit unit 30.

Further, the drive signal generating unit 21 obtains the difference value between the value of the DC output voltage Vdc and the value of the power supply voltage Vs and performs proportion control, proportion integral control, or proportion integral differential control on the difference value, thereby generating a hysteresis reference voltage to make the difference value agree with the phase of the power supply voltage Vs. In the description below, the hysteresis reference voltage is called a reference voltage $V_{ref}$, and the reference voltage $V_{ref}$ is a threshold to limit the value of the power supply current Is of the AC power supply 1.

This reference voltage $V_{ref}$ is generated by a circuit shown in FIG. 2 or 3. The circuit of FIG. 2 converts a pulse width modulating signal that is a port output Sb of the drive signal generating unit 21, into a DC value by a low-pass filter, thereby generating the reference voltage $V_{ref}$. In this case, by controlling the duty ratio of the pulse width modulating signal, the value of the reference voltage $V_{ref}$ can be changed seamlessly.

The circuit of FIG. 3 can change the value of the reference voltage $V_{ref}$ according to the voltage division ratio of the resistances Rb, Rc by driving a switch TR by the port output Sb of the drive signal generating unit 21. The circuit that generates the reference voltage $V_{ref}$ is not limited to this but may be a known circuit other than the circuit shown in FIG. 2 or 3, or such a reference voltage $V_{ref}$ that is generated outside the control unit 20 may be used.

The pulse converter 22 generates switching pulses to maintain the peak values of the power supply current Is, detected during the ON period t of the drive signal Sa, within a current control range w that is a target control range of the power supply current Is of the AC power supply 1. Specifically, upper-limit and lower-limit thresholds of the current control range w that centers the reference voltage $V_{ref}$ from the drive signal generating unit 21 are set in the pulse converter 22. The pulse converter 22 divides the drive signal Sa into plural pulses so as to maintain, between the upper-limit and lower-limit thresholds, the values of the power supply current Is detected during the ON period t of the drive signal Sa. The drive signal Sa1 is obtained by dividing the drive signal Sa. The ON period t is a period from the time the drive signal Sa is brought to an ON state to the time the drive signal Sa is brought to an OFF state. The upper-limit threshold regulates the upper limit of the short-circuit current that flows when the short-circuit unit 30 is on, and the lower-limit threshold is set to a smaller value than the upper-limit threshold. The pulse division operation by the pulse converter 22 is performed for positive and negative polarities of the AC power supply 1.

Further, the pulse converter 22 changes the upper-limit and lower-limit thresholds of the current control range w in order to make the power supply current Is become in phase with the power supply voltage Vs, that is, to bring the power supply current Is into a sine-wave shape. Here, the relations between the reference voltage $V_{ref}$, the current control range w, and the upper-limit and lower-limit thresholds are represented by the following expressions.

Upper-limit threshold: $V_{ref}+w/2$

Lower-limit threshold: $V_{ref}-w/2$

The pulse transmission unit 24, which is constituted by a level shift circuit that performs a voltage-level shift so as to be able to drive the gate, converts the drive signal Sa1 into the drive signal Sa2 and outputs the drive signal Sa2. By the drive signal Sa2 obtained in this way, the short-circuit unit 30 is opened and closed.

Next, the operation of the power converting device 100 of the first embodiment will be described. First, the operation when the pulse converter 22 does not perform pulse conversion will be described. The pulse conversion is an operation of dividing the drive signal Sa into plural pulses. Note that turning on/off the short-circuit unit 30 once to plural times during a power-supply half cycle in current open-loop control is called a partial switching pulse mode.

FIG. 4 shows current paths when the short-circuit unit 30 is turned on and off. When the short-circuit unit 30 is turned on, a closed circuit is formed by the AC power supply 1, the reactor 2, and the short-circuit unit 30, so that the AC power supply 1 is short-circuited via the reactor 2. Hence, the power supply current Is flows through the closed circuit, so that magnetic energy expressed by $(½)×LI^2$ is stored in the reactor 2.

At the same time that the short-circuit unit 30 is turned off, the stored energy is discharged towards the DC load 10 to be rectified by the rectifying circuit 3 and transferred to the smoothing capacitor 4. By this series of operations, the power supply current Is as shown in FIG. 5 flows, so that the current-carrying angle of the power supply current Is can be extended, as compared to a passive mode without improvement in power factor, resulting in improvement in power factor.

In the partial switching pulse mode, by controlling the short-circuit start time and short-circuit time of the short-circuit unit 30, the energy stored in the reactor 2 can be controlled, so that the DC output voltage Vdc can be boosted in a stepless manner. Although FIG. 5 shows one example of operation in the partial switching pulse mode providing the drive signal Sa1 that is a single pulse to perform switching of the short-circuit unit 30 once during a power-supply half cycle, the number of times of switching of the short-circuit unit 30 during the power-supply half cycle may be two or more.

Next, the waveform of the power supply current Is when the pulse converter 22 is not performing pulse conversion and the waveform of the power supply current Is when the pulse converter 22 is performing pulse conversion will be described in comparison.

FIG. 6 shows the waveform of the power supply current Is when the drive signal Sa that is a single pulse from the drive signal generating unit 21 is not converted into plural pulses. If the pulse converter 22 does not perform pulse conversion, the drive signal Sa1 becomes an ON state at a timing at which the drive signal Sa is brought to an ON state, and the drive signal Sa1 is in the ON state for a period equal to the ON period t of the drive signal Sa during the ON period t of the drive signal Sa. Thus, the short-circuit time of the short-circuit element 32 becomes longer in proportion to the ON period t of the drive signal Sa when the power supply voltage Vs is boosted, so that the power supply current Is increases as shown in the figure. Then when the power supply current Is reaches a set value, the drive signal Sa is brought to an OFF state, and the drive signal Sa1 becomes an OFF state at a timing at which the drive signal Sa is brought to an OFF state.

When the short-circuit time of the short-circuit element 32 is lengthened as discussed above, more energy can be stored in the reactor 2, but the problems such as the worsening of the power factor, the increase in harmonic components, the increase in circuit loss occur because the peak of the power supply current Is becomes larger.

FIG. 7 shows the waveform of the power supply current Is when the drive signal Sa that is a single pulse from the drive signal generating unit 21 is converted into plural pulses. When the pulse converter 22 performs pulse conversion, the drive signal Sa1 becomes an ON state at a timing at which the drive signal Sa is brought to an ON state, so that the power supply current Is increases. As the power supply current Is increases, the current detection voltage Vis output from the current detecting unit 7, that is, the current value detected by the current detecting unit 7 rises. Then when the detected current value becomes greater than the upper-limit threshold during the ON state of the drive signal Sa, the pulse converter 22 brings the drive signal Sa1 to an OFF state.

Thus, the power supply current Is decreases, after which the detected current value is lowered. Then when the detected current value becomes less than the lower-limit threshold during the ON state of the drive signal Sa, the pulse converter 22 brings the drive signal Sa1 to the ON state again. The power supply current Is increases again, so that the current value detected by the current detecting unit 7 increases.

In this way, the drive signal Sa1 is repeatedly switched between the ON state and the OFF state during the ON period t of the drive signal Sa, so that the value of the power supply current Is during the ON period t of the drive signal Sa is controlled to be within the current control range w. Thus, even where the DC output voltage Vdc is boosted to a relatively high value, the values of the power supply current Is when the drive signal Sa shown in FIG. 7 is in the ON state are suppressed more than the values of the power supply current Is when the drive signal Sa shown in FIG. 6 is in the ON state.

By adjusting the upper-limit and lower-limit thresholds as shown in FIGS. 8, 9, the number of switching times of the drive signal Sa1 during the ON period t of the drive signal Sa mentioned above is controlled, so that the waveform of the power supply current Is can be changed. The current control range w1 shown in FIG. 8 is wider than the current control range w2 shown in FIG. 9 and is set to be constant during the power-supply half cycle. By adjusting the upper-limit and lower-limit thresholds in this way, the performance can be satisfied in correspondence to the reactor 2, the DC load 10, and a harmonic standard.

Although an example where the pulse conversion permitting period equal to the ON period t of the drive signal Sa is set has been described above, the pulse conversion permitting period need not be equal to the ON period t of the drive signal Sa, but the pulse conversion permitting period t1 may be set shorter than the ON period t of the drive signal Sa, as shown in FIG. 10.

In the example of FIG. 10, the drive signal Sa1 becomes an ON state at the timing at which the drive signal Sa is brought to an ON state, so that the power supply current Is increases. The pulse converter 22 does not perform pulse conversion even if the detected current value becomes greater than the upper-limit threshold before the pulse conversion permitting period t1. When a pulse indicating the start of the pulse conversion permitting period t1 becomes an ON state, the drive signal Sa1 becomes an OFF state, so that the power supply current Is decreases. Then when the detected current value becomes less than the lower-limit threshold during the pulse conversion permitting period t1, the drive signal Sa1 is brought to an ON state in the pulse converter 22, so that the power supply current Is increases. Then when the detected current value becomes greater than the upper-limit threshold during the pulse conversion permitting period t1, the drive signal Sa1 is brought to an OFF state in the pulse converter 22, so that the power supply current Is decreases again.

Even if the pulse conversion permitting period t1 is set shorter than the ON period t of the drive signal Sa, as discussed above, the value of the power supply current Is during the pulse conversion permitting period t1 is controlled to be within the current control range w. Consequently, as compared to the case where the pulse conversion permitting period equal to the ON period t of the drive signal Sa is set, the number of switching times of the drive signal Sa1 is reduced, so that the temperature rise can be suppressed by suppression of element loss and noise can be reduced.

Alternatively, as shown in FIG. 11, the pulse converter 22 may be configured to start pulse conversion in response to a time having elapsed from a zero cross point t0 of the power supply voltage Vs. In the configuration example of FIG. 11, the drive signal Sa1 becomes an ON state at the timing at which the drive signal Sa is brought to an ON state, so that the power supply current Is increases until a given time T1 has elapsed from the zero cross point t0. Then the pulse converter 22 controls the power supply current Is to be within the current control range w until a given time T2 has elapsed from a point of time at which the given time T1 has elapsed.

By starting the pulse conversion in response to a time having elapsed from the zero cross point t0 of the power supply voltage Vs, as discussed above, the number of switching times of the drive signal Sa1 is reduced, as compared to the case where pulse conversion is performed during the entire ON period t of the drive signal Sa, so that temperature rises can be suppressed by suppression of element loss and noise can be reduced.

Next, a configuration example of the pulse converter 22 will be described. The pulse converter 22 shown in FIG. 12 is constituted by a positive-polarity-side hysteresis comparator HCH, a negative-polarity-side hysteresis comparator HCL, and a plurality of logic ICs.

The positive-polarity-side reference voltage $V_{refH}$ is a reference voltage $V_{ref}$ on the positive-polarity side generated by the drive signal generating unit 21, and the negative-polarity-side reference voltage $V_{refL}$ is a reference voltage $V_{ref}$ on the negative-polarity side generated by the drive signal generating unit 21.

The current detection voltage Vis that is the output of the current detecting unit 7 and the positive-polarity-side reference voltage $V_{refH}$ are input to the positive-polarity-side hysteresis comparator HCH. The current detection voltage Vis and the negative-polarity-side reference voltage $V_{refL}$ are input to the negative-polarity-side hysteresis comparator HCL.

The current detecting unit 7 shown in FIG. 1 has a level shift circuit and an amplifier provided at the output stage of the current detecting element 8. Taking ½Vd, i.e., a half of a low-voltage-system power supply Vd as corresponding to 0 amperes, the current detecting unit 7 converts the current waveform of an alternating-current detected by the current detecting element 8 into a current waveform having only the positive side to output this positive-side current waveform. The pulse converter 22 can generate the drive signal Sa1 regardless of current polarity.

Next, the operation of the pulse converter 22 shown in FIG. 12 will be described using FIG. 13.

In the positive-polarity-side hysteresis comparator HCH, hysteresis Δ corresponding to the current control range w on the positive-polarity side is determined by the relation between the positive-polarity-side upper-limit threshold $V_{THH}(H)$ calculated by the equation (1), the positive-polarity-side lower-limit threshold $V_{THH}(L)$ calculated by the equation (2), and the positive-polarity-side reference voltage $V_{refH}$. The output of the positive-polarity-side hysteresis comparator HCH is inverted by a NOT logic IC 3. An AND logic IC 2' takes an AND of the output of the NOT logic IC 3 and the drive signal Sa to output a positive-polarity-side drive signal SaH. $V_d$ in the equation (1) denotes the low-voltage-system power supply, and $V_{OL}$ in the equation (2) denotes the output saturation voltage of an operational amplifier.

[Expression 1]

$$V_{THH}(H) = V_{refH} + \frac{R_1}{R_1 + R_2 + R_3}(V_d - V_{refH}) \quad (1)$$

[Expression 2]

$$V_{THH}(L) = V_{refH} + \frac{R_1}{R_1 + R_2 + R_3}(V_{refH} - V_{OL}) \quad (2)$$

Likewise, in the negative-polarity-side hysteresis comparator HCL, the negative-polarity-side upper-limit threshold $V_{THL}(H)$ is calculated by the equation (1), and the negative-polarity-side lower-limit threshold $V_{THL}(L)$ is calculated by the equation (2).

Hysteresis Δ corresponding to the current control range w on the negative-polarity side is determined by the relation between the negative-polarity-side upper-limit threshold $V_{THL}(H)$, the negative-polarity-side lower-limit threshold $V_{THL}(L)$, and the negative-polarity-side reference voltage $V_{refL}$. An AND logic IC 2 takes an AND logic of the output of the negative-polarity-side hysteresis comparator HCL and the drive signal Sa to output a negative-polarity-side drive signal SaL. An AND logic IC 4 takes an AND logic of the positive-polarity-side drive signal SaH and the negative-polarity-side drive signal SaL to output the drive signal Sa1 that is the result of the AND logic.

By using the pulse converter 22 having the plurality of hysteresis comparators as shown in FIG. 12, the drive signal Sa1 can be generated regardless of current polarity, and the waveform of the power supply current Is of FIG. 13, that is, the current detection voltage Vis can be controlled. Thus, while suppressing the peak values of the short-circuit current flowing when the short-circuit unit 30 is turned on, the DC output voltage Vdc can be boosted.

The hysteresis comparators of FIG. 12 can change the width of their hysteresis Δ by changing the resistance values of the resistors R1, R2, R3. For example, a series circuit of a switch and a resistor is connected in parallel with the resistor R2 or R2', so that the combined resistance value can be switched by opening and closing the switch.

Although the first embodiment describes an example where the short-circuit unit 30 is controlled using the power supply current Is detected by the current detecting unit 7, the invention is not limited to this. By conducting a test in advance to have the power supply current Is correspondence to the drive signal Sa1 that is the plural switching pulses and inputting this correspondence relation from the outside or holding the correspondence relation in the control unit 20, the short-circuit unit 30 can be controlled without detecting the power supply current Is. As discussed above, whether the power supply current Is is detected or not should be selected according to the specifications of a system to be constructed.

Although in the first embodiment the hysteresis comparators constituted by hardware generates the drive signal Sa1, the hysteresis comparators may be constituted by software. Although the hysteresis comparators configured by the software provide the same effect as that provided by the hardware hysteresis comparators, the software hysteresis comparators increases the load on the control unit 20 as compared to the case where the hysteresis comparators are constituted by the hardware. Accordingly, it is desirable, from the viewpoint of reduction in load, that the hysteresis comparators be constituted by the hardware.

Although the power converting device 100 of the first embodiment is configured to generate the drive signal Sa1 using the current value detected by the current detecting unit 7, it may be configured such that the control unit 20 detects the value of the power supply current Is without using the current detecting unit 7 and generates the drive signal Sa1. Further, although in the first embodiment the reactor 2 is inserted between the AC power supply 1 and the rectifying circuit 3 and the rectifying circuit 3 is connected to the AC power supply 1 via the reactor 2, the positional relation between the rectifying circuit 3, the reactor 2, and the short-circuit unit 30 is not limited to that of the configuration of the example shown in the figures because the power converting device 100 need only be able to short-circuit and open the power supply via the reactor 2. That is, the power converting device 100 should be configured such that the power supply current Is flows through the AC power supply 1, the reactor 2, the short-circuit unit 30 and the AC power supply 1 in order when the short-circuit takes place. For example, it may be configured such that the rectifying circuit 3 is inserted between the AC power supply 1 and the reactor 2 and the reactor 2 is connected to the AC power supply 1 via the rectifying circuit 3.

As described above, the power converting device 100 according to the first embodiment includes the rectifying circuit 3, the short-circuit unit 30 that short-circuits the AC power supply 1, and the control unit 20 that generates the drive signal Sa1 that is the plural switching pulses to control the short-circuit unit 30 during the half cycle of the AC power supply 1, and the control unit 20 generates the sine-wave-shaped current control range w that is a target control range of the power supply current Is of the AC power supply 1, and maintains the values of the power supply current Is within the current control range w.

With this configuration, the DC output voltage Vdc can be boosted while the peaks of the power supply current Is is suppressed, as compared to the conventional simple switching converter. Since the peaks of the power supply current Is can be suppressed, the distortion of the power supply current Is when the short-circuit unit 30 is on can be suppressed, so that harmonic components can be suppressed. Further, since the peaks of the power supply current Is can be suppressed, the period over which the power supply current Is flows can be extended, so that the power factor can be improved. Yet further, since the peaks of the power supply current Is can be suppressed, the increase in the capacitance of a filter circuit and the other components forming the AC power supply 1 can be suppressed, so that the increase in cost can be suppressed. In the power converting device 100 of the first embodiment, where the switching is performed the plural times during the power-supply half cycle, the set time of each switching pulse need not be designed and the design of the thresholds for the current upper limit and lower limit thresholds, which correspond to the positive and negative polarities, is enabled, so that the control design is relatively easy. Further, the power converting device 100 of the first embodiment can perform the control using the suitable number of times of the switching and the suitable pulse timings, regardless of the load condition, so that the design load can be reduced.

In the power converting device 100 of the first embodiment, the reference voltage $V_{ref}$ can vary in the sine-wave shape during the power-supply half cycle, and hence the degree of freedom of the control over the power supply current Is can be increased as compared to the case where the reference voltage $V_{ref}$ does not vary. Further, because the hysteresis comparators perform part of processing in the control unit 20, the computation load on the control unit 20 is reduced, so that the power converting device 100 can be made of an inexpensive central processing unit. Since the reference voltage $V_{ref}$ varies in the sine-wave shape, excessive increase in switching pulses can be prevented, and thus the occurrence of noise can be suppressed. Yet further, since the reference voltage $V_{ref}$ varies, the pulse division operation can be limited to only a specific area. Hence, noise due to switching operation can be reduced.

Second Embodiment

Figure 14:
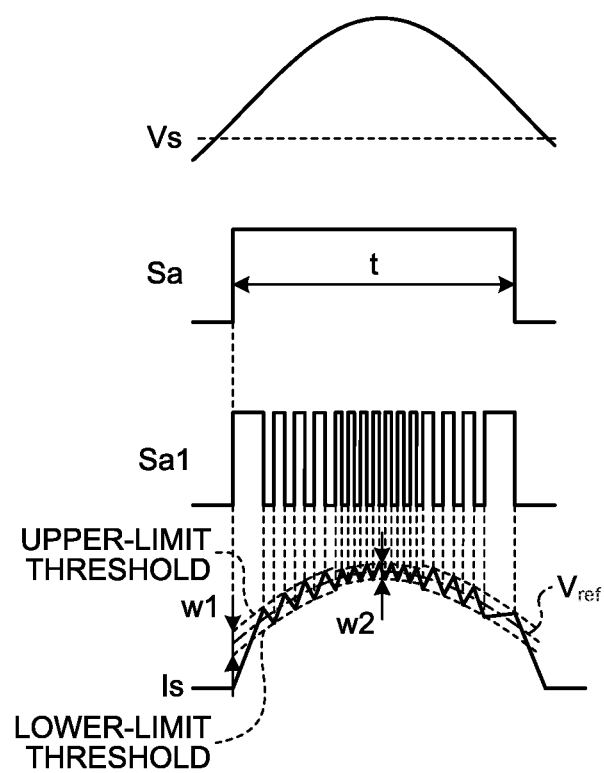
FIG. 14 is an explanatory diagram of the operation of a power converting device according to a second embodiment of the present invention.
Figure 15:
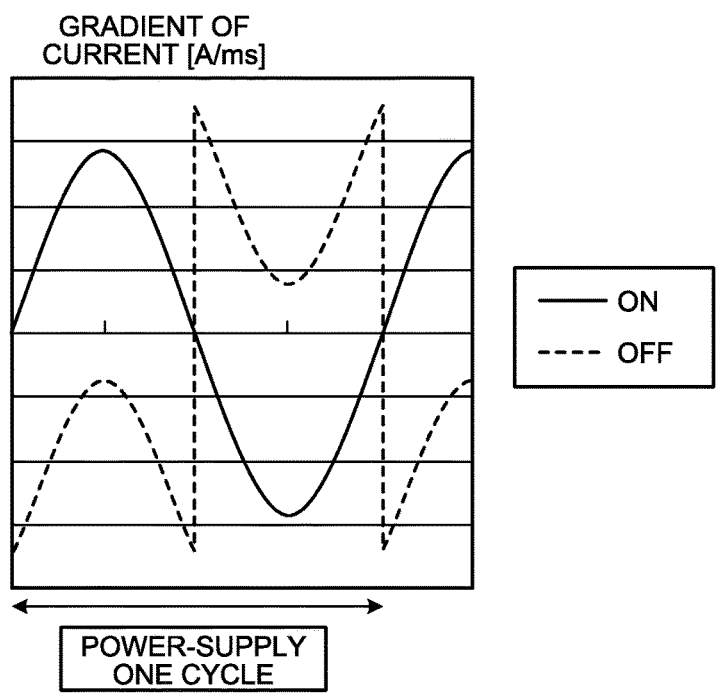
FIG. 15 is a diagram showing the relation between the power-supply cycle and the rate of change in the power supply current.
Figure 16:
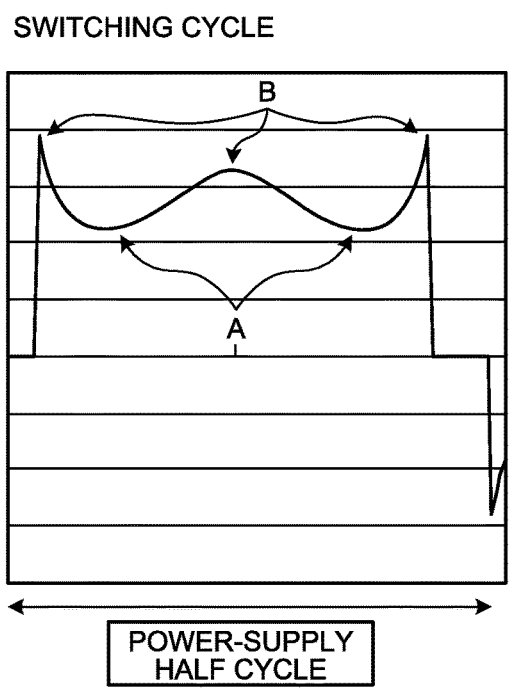
FIG. 16 is a diagram showing the relation between the power-supply cycle and the switching cycle in the case where the current control range is constant relative to the power-supply cycle.

FIG. 14 is an explanatory diagram of the operation of a power converting device 100 according to a second embodiment of the present invention. FIG. 15 is a diagram showing the relation between the power-supply cycle and the rate of change in the power supply current. FIG. 16 is a diagram showing the relation between the power-supply cycle and the switching cycle in the case where the current control range w is constant relative to the power-supply cycle. The power converting device 100 according to the second embodiment includes the same elements as those in the first embodiment, but differs in that the current control range w is changed in correspondence to the phase of the power supply voltage Vs.

The horizontal axis of FIG. 15 represents the phase, and the vertical axis represents the gradient of the power supply current Is that is the change rate of the power supply current Is. The waveform indicated by a solid line denotes the gradient of the power supply current Is when the short-circuit unit 30 is on during the power-supply half cycle, and the waveform indicated by a broken line denotes the gradient of the power supply current Is when the short-circuit unit 30 is off. The gradient of the power supply current Is when the short-circuit unit 30 is on is given by Vs/L, and the gradient of the power supply current Is when the short-circuit unit 30 is off is given by (Vs−Vdc)/L if current polarity is positive and by (Vs+Vdc)/L if current polarity is negative. Vs denotes the power supply voltage, Vdc denotes the output voltage, and L denotes the inductance of the reactor 2. It is seen from FIG. 15 that the change rate of the power supply current Is, that is, the gradient of the power supply current Is when the short-circuit unit 30 is on differs from the gradient of the power supply current Is when the short-circuit unit 30 is off.

The horizontal axis of FIG. 16 represents the phase, and the vertical axis represents the switching cycle of the drive signal Sa. The switching cycles indicated by reference characters A denote the switching cycles at phases between a vicinity of a zero cross of the power supply voltage Vs and a peak value of the power supply current Is. The switching cycles indicated by reference characters B denote the switching cycles at the phase in the vicinity of the zero cross of the power supply voltage Vs and the switching cycle at a phase in the vicinity of the peak of the power supply current Is.

It is seen that, if the current control range w is a constant value, the switching cycles at the phases indicated by the reference characters A are shorter than the switching cycles at the phases indicated by reference characters B. That is, the switching frequency of plural drive signals Sa1 generated during the power-supply half cycle is not a constant value. In other words, the switching cycle of the plural drive signals Sa generated during the power-supply half cycle changes according to the phase of the power supply voltage Vs. This is because, if the current control range w is the constant value, the gradient of the power supply current Is when the short-circuit unit 30 is on differs from the gradient of the power supply current Is when the short-circuit unit 30 is off, as described with reference to FIG. 15.

If the switching frequency is relatively high, the problems of increase in loss due to the switching, radiant noise, and noise terminal voltage may occur. In order to take measures against these problems, in the pulse converter 22 of the second embodiment, the current control range w1 at phases in the area whose switching cycle is shorter is widened, as shown in FIG. 14, thereby lowering the switching frequency and suppressing the increase in loss, the radiant noise, and the noise terminal voltage.

If the switching frequency is relatively low, the problem of noise in an audible frequency band may occur. In order to take measures against this problem, in the pulse converter 22 of the second embodiment, the current control range w2 at phases in the areas whose switching periods are longer is narrowed, as shown in FIG. 14, thereby increasing the switching frequency and suppressing the noise.

The pulse converter 22 of the second embodiment may be configured to determine the phase of the power supply voltage by using the elapsed time from a zero cross of the power supply voltage Vs. With this configuration, the current control ranges w1, w2 can be controlled without adding means to detect the phase of the power supply voltage Vs.

Alternatively, the pulse converters 22 of the first and second embodiments may be configured to change the current control range w in correspondence to the frequency of the drive signal Sa1 that is the plural switching pulses. For example, when the frequency of the drive signal Sa1 becomes greater than or equal to a specified value as a result of increasing the frequency of the drive signal Sa1, the pulse converter 22 widens the current control range w in order to make the frequency of the drive signal Sa1 less than the specified value. With this configuration, the load in generating the drive signal Sa1 is reduced, so that the power converting device 100 can be made of inexpensive components.

Although the first and second embodiments describes an example where the short-circuit unit 30 is controlled using the power supply current Is detected by the current detecting unit 7, the invention is not limited to this. By conducting a test in advance to have the power supply current Is correspond to the drive signal Sa1 that is the plural switching pulses and inputting this correspondence relation from the outside or holding the correspondence relation in the control unit 20, the short-circuit unit 30 can be controlled without detecting the power supply current Is. As discussed above, whether the power supply current Is is detected or not should be selected according to the specifications of a system to be constructed.

Although the power converting devices 100 of the first and second embodiments are configured to generate the drive signal Sa1 using the current value detected by the current detector 9 provided outside the control unit 20, it may be configured such that the control unit 20 directly detects the value of the power supply current Is without using the current detecting unit 7 and generates the drive signal Sa1.

INDUSTRIAL APPLICABILITY

As above, the present invention is useful for power converting devices including a short-circuit unit that short-circuits the AC power supply.

The invention claimed is:

1. A power converting device comprising:
a rectifying circuit that converts alternating-current power from an alternating-current power supply into direct-current power;
a short-circuit unit that short-circuits the alternating-current power supply via a reactor; and
a control unit that receives inputs that are a voltage detected from the alternating-current power supply and a voltage detected from the rectifying circuit, and outputs, as a drive signal for the short-circuit unit, plural switching pulses to control the short-circuit unit during a half cycle of the alternating-current power supply,
wherein the control unit
generates a sine-wave-shaped current control range that is based on a reference voltage wave shaped into a sine-wave, and that is a target control range of power supply current of the alternating-current power supply,
the sine-wave-shaped current control range being set by an upper-limit threshold and a lower-limit threshold for a reference voltage in the reference voltage wave and
outputs the drive signal to maintain values of the power supply current within the current control range.

2. The power converting device according to claim 1, wherein the control unit generates the current control range which is in phase with a power supply voltage of the alternating-current power supply.

3. The power converting device according to claim 2, wherein the control unit determines a phase of the power supply voltage of the alternating-current power supply by using an elapsed time from a zero cross point of the power supply voltage.

4. The power converting device according to claim 1, wherein the control unit widens the current control range in correspondence to a phase of the power supply voltage of the alternating-current power supply.

5. The power converting device according to claim 1, wherein the control unit narrows the current control range in correspondence to a phase of the power supply voltage of the alternating-current power supply.

6. The power converting device according to claim 1, wherein the control unit changes the current control range in correspondence to a frequency of the plural switching pulses.

7. The power converting device according to claim 1, wherein a correspondence relation between the plural switching pulses and the power supply current is set in the control unit, and the control unit controls the short-circuit unit by using the correspondence relation.

8. The power converting device according to claim 1, wherein the control unit controls the short-circuit unit by using the power supply current detected by a current detector provided outside the control unit or detects the power supply current directly without using the current detector to control the short-circuit unit.

9. The power converting device according to claim 1, wherein the reactor is connected between the alternating-current power supply and the rectifying circuit.

10. The power converting device according to claim 1, wherein the control unit outputs the drive signal after a lapse of a given time from a zero cross of the power supply voltage.

* * * * *